A. S. Maxwell,
Bakers Table.
No. 108,373.
Patented Oct. 18, 1870.

Witnesses:
P. C. Dieterich
L. S. Mabee

Inventor:
A. S. Maxwell
PER
Attorneys.

United States Patent Office.

ALONZO S. MAXWELL, OF DIXON, ILLINOIS.

Letters Patent No. 108,373, dated October 18, 1870.

IMPROVEMENT IN BAKERS' TABLES.

The Schedule referred to in these Letters Patent and making part of the same.

*To all whom it may concern:*

Be it known that I, ALONZO S. MAXWELL, of Dixon, in the county of Lee and State of Illinois, have invented a new and useful Improvement in Tables for Bakers; and I do hereby declare that the following is a full, clear, and exact description thereof, which will enable others skilled in the art to make and use the same, reference being had to the accompanying drawing forming part of this specification.

This invention relates to improvements in tables for bakers' use, and consists in the application of a heat-reflector and a holder below the top of the table, for holding and keeping warm the dough previous to baking, for raising the same, the table being so placed, relatively to the fire, that heat rays thrown out by it will be received in the reflector. The holder is made with openings for the heat to rise up to the space above, where the dough is placed.

The invention also consists in inclosing the sides or some of the sides of the space above the holder with wire-gauze, or other reticulated substance, through which the air may circulate, and arranging the reflectors' sides and bottom to fold up under the holder, to exclude flies from the space above the holder, in which baked articles may then be kept.

Similar letters of reference indicate corresponding parts.

Figure 1:
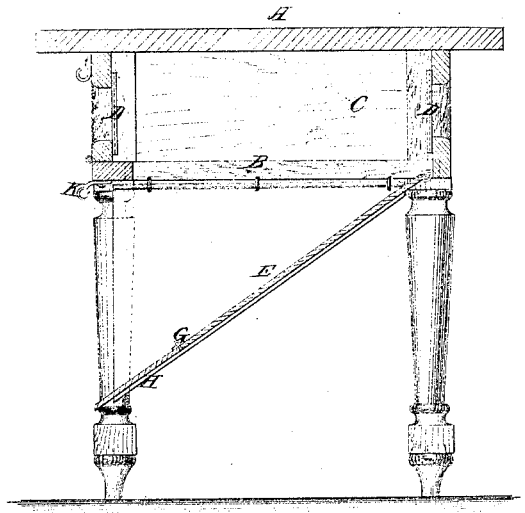
Figure 1 is a sectional elevation of my improved table.
Figure 2:
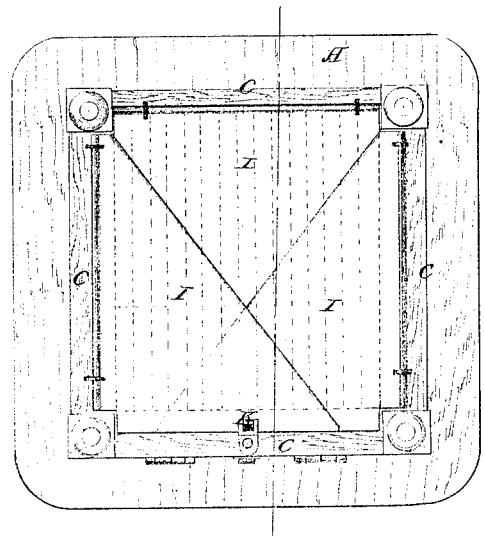
Figure 2 is a plan of the bottom of the same.

A is a kitchen or other table of any kind, to which I apply a shelf or holder, B, below the top and between the legs, said holder being made with openings of any kind, to allow the air to rise up through it from below.

The sides of the space above the holder are cased up, either with the ordinary strengthening-rails C, of the frame of the table, or by other suitable casings.

Two or more of these casings are provided with large openings, over which wire gauze or other reticulated substance, D, is placed, to admit the passage of air and exclude the flies.

Below this holder is a tin or other sheet-metal plate, E, hinged to the said bottom at one side, and arranged so that the opposite edge may be let down to supports near the lower ends of the legs, to maintain the said plate on an incline of about forty-five degrees.

The said plate has a joint at G, for folding over the part H when it is to be retained in the horizontal position, immediately under the holder B.

At each end of the plate E is a triangular plate, I, also hinged to the under side of the holder B, to swing downward therefrom, but they swing down to the vertical line and form sides for the space between the plate E and holder, so that, the front being open, and the table being set with the opening toward the fire, the heat-rays received against the plate E, to be reflected upward, will not encounter currents of cold air, which would otherwise rush in at the ends.

All these plates may be folded up against the under side of the holder, and secured by buttons, K, hooks, or other means.

The apparatus, when so folded up, constitutes a convenient receptacle for baked articles, to which air is admitted, while the flies will be excluded.

This table may be used for all the common uses of ordinary tables.

Having thus described my invention,

I claim as new and desire to secure by Letters Patent—

1. A table provided with a dough-holder and heat-reflector under the top, substantially as specified.

2. The arrangement, with the dough-holder and the casings C D therefor, of the plates E I, of the reflector, for folding up against the bottom of the holder, all substantially as specified.

ALONZO S. MAXWELL.

Witnesses:
JAMES L. CAMP,
A. C. BARDWELL.